United States Patent Office 3,243,531
Patented Mar. 29, 1966

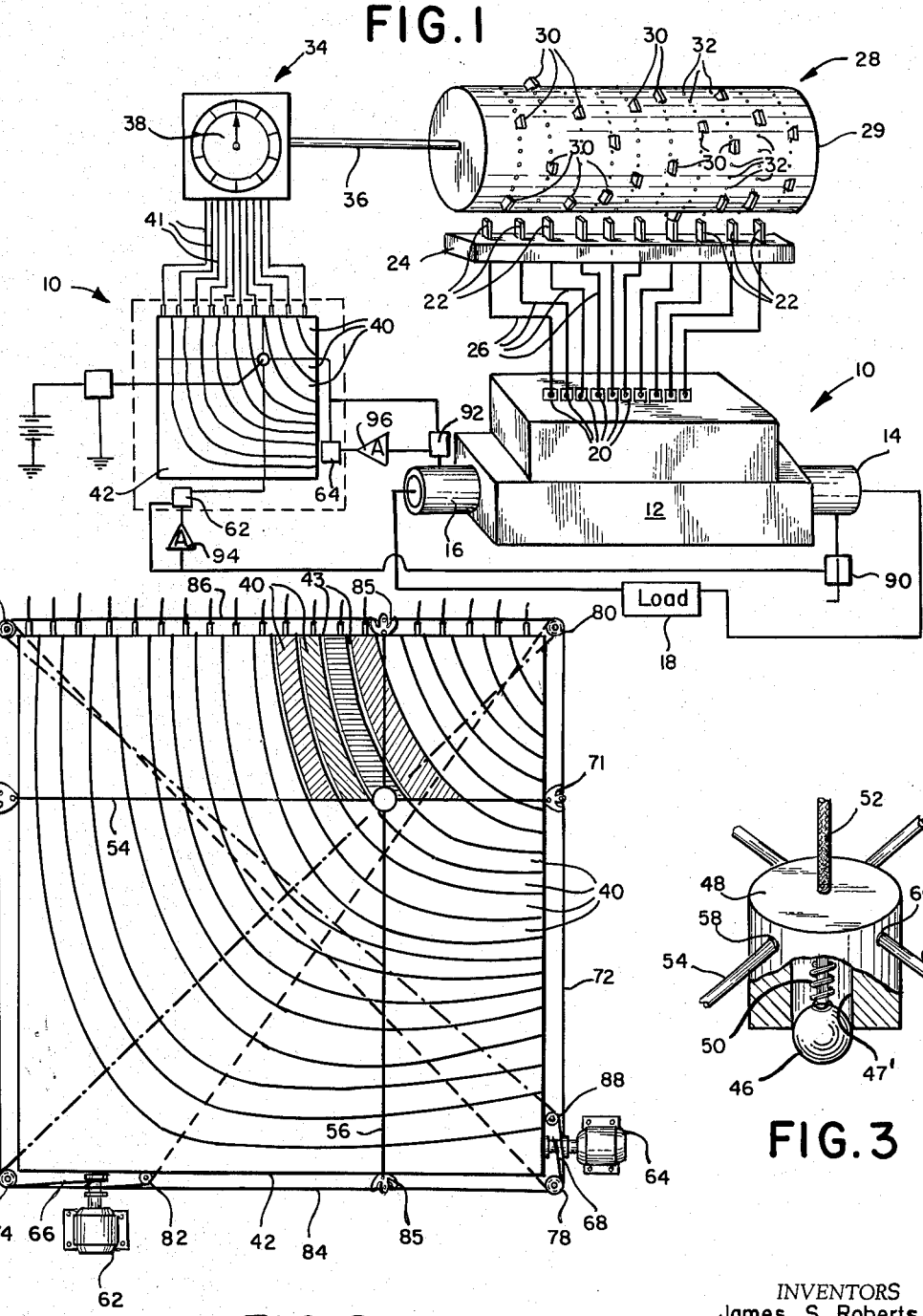

3,243,531
AUTOMATIC CONTROL SYSTEM
James S. Roberts, Brookfield, and Robert H. Ahrens, Milwaukee, Wis., assignors to Milwaukee Chaplet & Mfg. Company, Inc., Milwaukee, Wis.
Filed July 17, 1963, Ser. No. 295,712
12 Claims. (Cl. 200—36)

This invention relates to an automatic control system for a motor or engine driven unit such as a multiple stage compressor and more particularly to an electric controller for such systems.

In an engine or motor driven multiple stage compressor the operating efficiency of the compressor varies considerably under overload or underload conditions. By controlling the clearance and displacement of the various stages in the compressor, it is possible to maintain the operating efficiency of the compressor at a predetermined percentage by loading or unloading the cylinders according to the load conditions. This is normally done by the operator who visually checks the suction and discharge pressures of the compressor and manually actuates electric switches to load or unload the various stages of the compressor. A complicated control panel is usually required in order to make the visual observation of the pressures and to actuate the appropriate switches. The operator must also be trained to recognize the adjustments necessary to overcome the underloading and overloading of the compressor and to set up the compressor stage combination necessary to obtain the required efficiency.

The primary object of this invention is to provide an electric controller for a power unit that automatically maintains a predetermined operating condition of such unit under all normal load conditions.

Another object of this invention is to provide an electric controller for a power driven unit that is functionally simple and reliable.

A further object of this invention is to provide an electric controller that requires a minimum amount of skill to operate.

A still further object is to provide an electric controller for an engine or motor driven compressor that is substantially free of maintenance requirements once it has been set up.

A still further object is to provide an electric controller that is responsive to analogue voltage signals and provides a control signal which does not require conversion to digital increments.

Another object is to provide an electric controller that instantly responds to changes in the load on a power unit and emits a control signal that corrects the operating condition of the power unit to the new condition.

These objects are accomplished by plotting a family of efficiency curves for a multiple stage compressor on logarithmic graph paper with the suction and discharge pressures as the "$x$" and "$y$" coordinates on the graph. Each curve in the family of curves represents the efficiency for a specific combination of compressor stages. The combination of compressor stages which are plotted are chosen from the most commonly encountered load conditions. The family of curves is duplicated on a printed circuit board in the form of printed circuits having a "bandwidth" in slightly raised metal with a small gap isolating each curve from the adjacent curve. The curves are energized by means of an electrically energized roller that is moved or driven about the surface of the circuit board in response to changes in the two variables. The control signal from the energized circuit is used to position a program controller for the control switches on the compressor stages. Since the circuit energized represents a known efficiency for a certain combination of compressor stages, and that combination of stages is actuated whenever the corresponding circuit is energized the compressor will always be operating at the desired efficiency. The advantages of such a system are that the adjustment is substantially instantaneous with each change in load, no visual check is required by the operator and the unit can be made small and compact because of the use of a printed circuit board.

Other objects and advantages will be more readily apparent by reference to the following specification when read in conjunction with the accompanying drawings, in which FIG. 1 is a schematic diagram of an automatic control system for a multiple stage compressor.

FIG. 2 is an enlarged view of the electric controller printed on a circuit board.

FIG. 3 is an enlarged view of the electrically conductive ball type roller used to energize the circuits on the board.

In the drawing, electric controller 10 is shown connected in a control cycle for a multiple stage compressor in a refrigerating system. A refrigerating system is shown by way of example only since it should be obvious that the electrical controller can be used in any system where variations in the load on a system produces changes in at least two variables which can be plotted on a known curve relation for the function switches in the system. The relation of the two variables are then automatically plotted on the known set of curves which produce a control signal to automatically adjust the operating functions of the system.

This is more clearly shown in FIG. 1 of the drawing where a multiple stage compressor 12 having an inlet 14 and an outlet 16 is connected in a refrigerating system represented by load 18. As is known in the art, variations in the load on the compressor will produce corresponding changes in the suction and discharge pressures at the inlet and outlet of the compressor which either underload or overload the compressor. Formerly solenoid valves 20 for controlling the clearance in the compressor stages were manually actuated from a switch panel whenever a change in the load was noted by the operator in order to maintain the operating efficiency of the compressor at or above a minimum efficiency of 90%.

In the present system solenoid switches 22 are shown mounted in a switch panel 24 and are connected by lines 26 to the solenoid valves. The solenoid switches are actuated in predetermined combinations by program controller 28. The operation of a program controller of this type is well known and is shown and described in copending application of Welch et al., Serial No. 845,480 filed October 9, 1959, and assigned to the same assignee. A program is set upon program controller drum 28 by placing a number of switch actuating pins 30 in certain of the holes 32 so that the pins are longitudinally aligned on the drum. The pins are arranged to actuate one or more of the solenoid switches at each position of the drum. Each switch combination on the drum thus establishes a different combination of actuated solenoid switches which determine the percent clearance of the various stages of the compressor for the particular load condition.

The stage combinations are determined by plotting a family of efficiency curves for various suction and discharge pressures for the compressor on logarithmic graph paper. The number of curves plotted is limited to the number of programs available on the program controller. The curves are therefore selected according to the most commonly encountered load conditions. The controller used in the present system can be rotated through a complete revolution in thirty-six steps so there are thirty-six program combinations available on the drum. Thirty-six curves are then printed on the circuit board although only twenty curves are shown in the drawing to simplify the explanation. A thirty-six position drum is shown by way of example only since it is possible to provide drums with one hundred or more positions.

The program controller is automatically stepped to the various programs by an automatic drum positioner 34 that responds to control signals from the electric controller. The drum positioner shown has thirty-six stopping points and is directly connected to the program controller by shaft 36. The operation of such seeking systems is well known so that the circuit for the system is not shown but is described briefly hereinafter. When an electrical control signal is transmitted to the positioner, it will open a switch and start the drum rotating. The positioner will be advanced until it reaches the open switch stopping the rotation of the drum. The program on the drum which is aligned with the solenoid switch will set up the operating compressor stages. When the control signal changes, the open switch will close, a new switch will be opened and the drum will again start rotating. The positioner will again advance until the pointer reaches the opened switch to step the program controller at a new program. Any type of seeking system can be used for controlling the advance of the program controller, the above being only one way to accomplish the desired result.

The control signals for the positioner are set up by energizing printed circuits 40 on printed circuit board 42 in the electrical controller. The signal from the printed circuits is transmitted to the switch in the seeking circuit by lines 41. The curves for the printed circuits correspond to the operating efficiency for the compressor under various load conditions and are the same family of curves used for establishing the program combinations on the program controller. Theoretically as the load changes, the combination of compressor stages that are operative must also be changed in order to maintain the operating efficiency of the compressor at the desired percentage. Each curve on the printed circuit board therefore represents the operating efficiency for a program combination on the drum under known load conditions. The "bandwidth" of each curve will be relatively small when thirty-six curves are printed on the board but will provide greater accuracy of control as well as efficiency of operation of the electric controller because of the reduced "bandwidth" of the printed circuits. As seen in FIG. 2 each printed circuit 40 is separated from the adjacent circuit by a small gap 42. This assures that a signal will always be given to the positioner 34 regardless of the load condition as described below.

The printed circuits are energized by means of a silver plated electrically conductive ball 46 that is positioned within a cylindrical opening 47 in housing 48. The ball is biased outward by an electrically conductive spring 50 which is connected to a small flexible electric traveling cable 52. A horizontal cord 54 and a vertical cord 56 are passed through openings 58 and 60, respectively, in the housing so that the ball is always located at the intersection of the two cords. Any motion in either or both of the cords will cause a corresponding motion in the ball and as it travels across the circuit board it will energize different printed circuits.

The horizontal and vertical cords represent the "x" and "y" coordinates, respectively. The coordinating cords are moved by means of servomotors 62 and 64, respectively, which drive cords 66 and 68 which are looped around a number of posts on the board. Considering the horizontal cord or "x" coordinate only it can be seen that the ends of the cord are secured to parallel portions 70 and 72 of the loop 66 by clamps 71. In order to produce the same vertical direction of motion on both sides of the printed circuit board, the vertical moving loop, starting from motor 62, is passed around posts 74, 76, 78, 80 and 82 ending up at motor 62. For horizontal motion, the ends of vertical cord 56 or "y" coordinate are secured to parallel portions 84, 86 of horizontal moving loop 68 by clamps 85. The horizontal moving loop starting from motor 64 is passed around posts 78, 74, 80, 76 and 88 ending up at motor 64. The movement of the "x" and "y" coordinates can be accomplished in a number of different ways, the above specific arrangement being shown by way of example only.

The servomotors are energized to move the loops by means of pressure transducers 90 and 92 that are connected to the inlet and outlet, respectively, of the compressor. The pressure transducers produce analogue voltage signals, voltage proportionate to pressure, which are amplified by amplifiers 94 and 96 and delivered to the servomotors. Any variation in the suction or discharge pressures of the compressor will be immediately sensed by the transducers and sent to the servomotors producing an immediate change in the position of the "x" and "y" coordinate cords and in the position of the ball on the roller.

In operation, the system is fully automatic. Whenever the compressor is operating, the circuits to the control system will be energized by any suitable switching arrangement off of the circuits for the compressor. The suction and discharge pressures at the inlet and outlet of the compressor will be sensed by the pressure transducers and an analogue voltage signal which is then amplified will be transferred to the servomotors on the electric controller. The servomotors will move the electrically conductive ball across the surface of the printed circuit board until a stable pressure condition is set up on the compressor. The ball will then come to rest and a control signal will be set up in the energized printed circuit. This signal is sent to the program positioner and controller to start the drum rotating to the indicated program. If the load on the compressor varies considerably, it may be necessary to include a delay circuit in lines 41 so that the program controller will not be rotated until the ball has come to rest on the printed circuit board for a predetermined period of time. Otherwise the program controller is liable to be continually rotating whenever the compressor is operating. Once the positioner has reached the position indicated by the controlled signal, the program controller will stop rotating and will actuate the combination of switches corresponding to the efficiency curve which has been energized on the printed circuit board. The compressor will then be operating at the indicated efficiency and will continue to operate at that efficiency until a change occurs on the load on the compressor.

Although only one embodiment of the present invention has been shown and described it should be readily apparent that various modifications and changes can be made in this invention without departing from the scope of the appended claims.

We claim:

1. A control system for controlling the operation of a multiple stage compressor in response to changes in the load on the compressor comprising valve control means for controlling the operation of the stages of said compressor, switch means for actuating said valve means, means for actuating said switch means according to predetermined programs, means for moving said actuating means to a specific program in response to a control signal, printed circuit means having a number of printed circuits thereon electrically connected to the moving means, means for energizing said printed circuits to set up the control signal for the moving means, and means responsive to the suction and discharge pressures of said compressor to move the energizing means with respect to the printed circuit means thereby energizing a different printed circuit for each change in the suction and discharge pressure relation.

2. A control system according to claim 1 wherein each of said printed circuits on said printed circuit means corresponds to a program on said actuating means, said moving means advancing said actuating means to the switch program corresponding to the printed circuit energized by the energizing means.

3. A control system according to claim 2 wherein each of said printed circuits represents a predetermined operating efficiency for the combination of pressure stages actuated by the program on the program controller.

4. A control system according to claim 3 wherein said actuating means comprises a drum type switch actuator having ten switch actuating pin positions for each program and thirty-six programs on the controller, whereby one or more compressor stages may be actuated in any position of the controller.

5. A control system according to claim 4 wherein said energizing means includes a housing having an electrically conductive ball positioned to engage the surface of said printed circuit board and electrical circuit means for energizing said ball, the movement of said ball across said printed circuit board thereby energizing the printed circuits mounted thereon.

6. A control system for maintaining the operating efficiency of a multiple stage compressor comprising
a number of solenoid valves for controlling the operation of the stages of a compressor,
switch means for actuating said valves,
means for actuating said switch means according to predetermined programs,
means for automatically moving said actuating means to a specific program in response to a control signal,
printed circuit means indicating the compressor efficiency for each program on the controller,
means for energizing each of said circuit means to produce a control signal for said automatic moving means,
and means responsive to variations in the inlet and outlet pressures of the compressor to move the energizing means with respect to the printed circuit according to the particular operating conditions sensed, thereby establishing a program relation for the solenoid valves having a predetermined efficiency.

7. A control system for a refrigerating device according to claim 6 wherein
said printed circuit means comprises a printed circuit board having a printed circuit thereon for each program on the actuating means,
each of said circuits representing an efficiency for the compressor based on the inlet and outlet pressures under known compressor loads.

8. A control system for automatically maintaining the operating efficiency of a multiple stage compressor at or above a predetermined minimum efficiency comprising
a solenoid valve for each stage of the compressor,
switch means for actuating said valves,
program means for actuating said switches according to predetermined combinations,
a printed circuit board having a circuit printed thereon for each combination of switches provided by said program means,
means for sensing the inlet and outlet pressures of said compressor,
means responsive to said sensing means to energize one of said circuits,
program selector means responsive to the energized circuit on said printed circuit board for indicating the programs on the program means required to provide the switch combination for the sensed pressures on the compressor,
whereby said multiple stage compressor will operate at an efficiency determined by the combination of actuated valves.

9. A control device according to claim 6 wherein said circuit means comprises an efficiency chart for each switch combination on said program controller.

10. A control device according to claim 7 wherein said first responsive means includes a ball type electrically conductive roller which is positioned to roll on the surface of the circuit means to energize the printed circuits thereon.

11. A control system for controlling the operation of a machine comprising
printed circuit means having a plurality of printed circuits thereon respectively insulated from one another, said circuits representing a family of efficiency curves for said machine,
means for simultaneously sensing a plurality of operating conditions of said machine,
means responsive to said sensing means for energizing a selected one of said circuits in accordance with the the relationship between said plurality of operating conditions, and
program selector means responsive to the energized circuit on said printed circuit means for controlling the operation of said machine in accordance with a selected one of a plurality of predetermined programs to maintain the efficient operation of said machine under said operating conditions.

12. A control system for controlling the operation of a machine in response to changes in the operating conditions of said machine comprising
control means for controlling the operation of said machine,
switch means for actuating said control means and, including a drum type switch actuator having a drum and a plurality of switch actuating positions for each of a plurality of programs on said drum,
drive means for rotating said drum to specific ones of said drum positions in response to respective control signals supplied thereto, and
sensing means responsive to a plurality of said changes in said operating conditions for applying control signals to said drive means to rotate said drum to select one of said programs.

References Cited by the Examiner
UNITED STATES PATENTS

| | | | |
|---|---|---|---|
| 1,811,261 | 6/1931 | De Jeu | 200—36 |
| 2,762,952 | 9/1956 | Bruderlin | 200—46 X |
| 2,905,239 | 9/1959 | Dietz | 200—37 X |
| 3,151,257 | 9/1964 | Anderson | 200—36 X |

KATHLEEN H. CLAFFY, *Primary Examiner.*

ROBERT K. SCHAEFER, *Examiner.*

W. C. GARVERT, *Assistant Examiner.*